(12) United States Patent
Hamid et al.

(10) Patent No.: US 6,848,052 B2
(45) Date of Patent: Jan. 25, 2005

(54) HIGH SECURITY PERSONALIZED WIRELESS PORTABLE BIOMETRIC DEVICE

(75) Inventors: Larry Hamid, Ottawa (CA); Derek Bouius, Ottawa (CA); Albert Hum, Ottawa (CA)

(73) Assignee: Activcard Ireland Limited, Dublin (IE)

(*) Notice: Subject to any disclaimer, the term of this patent is extended or adjusted under 35 U.S.C. 154(b) by 861 days.

(21) Appl. No.: 09/812,812

(22) Filed: Mar. 21, 2001

(65) Prior Publication Data

US 2002/0138742 A1 Sep. 26, 2002

(51) Int. Cl.[7] .............................. H04L 9/00; G06K 9/00
(52) U.S. Cl. ....................... 713/186; 713/182; 713/200; 713/202; 380/270; 382/124; 382/126; 382/127; 340/825.3; 340/825.31; 340/825.34
(58) Field of Search ................................. 713/186, 182, 713/200, 202; 380/270; 382/124, 126, 127; 340/825.3, 825.31, 825.34

(56) References Cited

U.S. PATENT DOCUMENTS

| | | | |
|---|---|---|---|
| 6,111,977 A | | 8/2000 | Scott et al. |
| 6,141,588 A | * | 10/2000 | Cox et al. .................... 607/9 |
| 6,747,632 B2 | * | 6/2004 | Howard ..................... 345/158 |
| 2002/0138742 A1 | * | 9/2002 | Hamid et al. ............... 713/186 |

* cited by examiner

*Primary Examiner*—Ly V. Hua
(74) *Attorney, Agent, or Firm*—Freedman & Associates

(57) ABSTRACT

The present application discloses a wireless hand held portable security device in the form of a wireless hand held portable biometric device in communication with a plurality of ubiquitous items for receiving information from, and sending information to the plurality of ubiquitous items, comprising a processor for selecting at least one item of the plurality of ubiquitous items and for sending information to the selected item in order to activate or deactivate or send a programming to the selected item. The level of security and the personalization is achieved by using a fingerprint or a combination of fingerprints for accessing communication with a selected item.

25 Claims, 7 Drawing Sheets

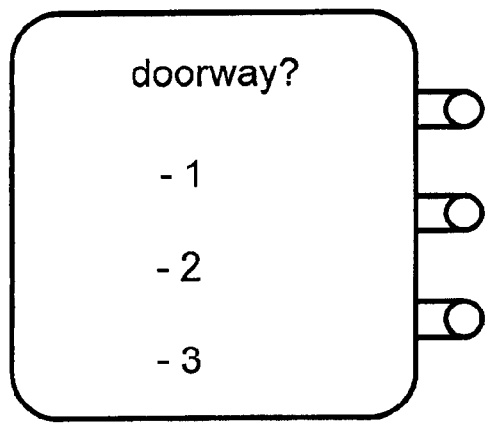
Figure 5a
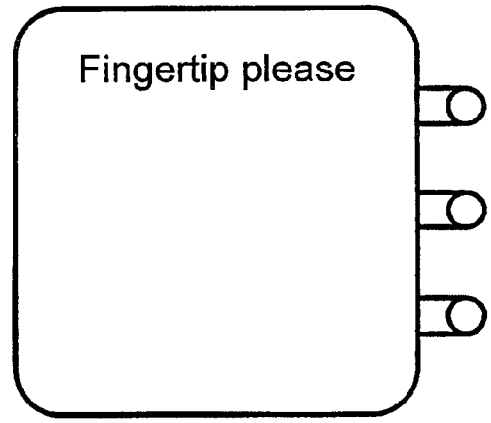
Figure 5b
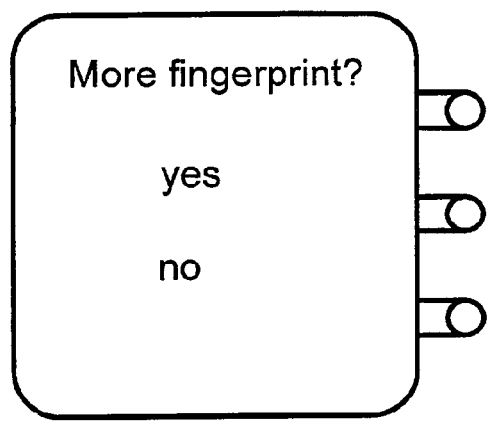
Finger 5c
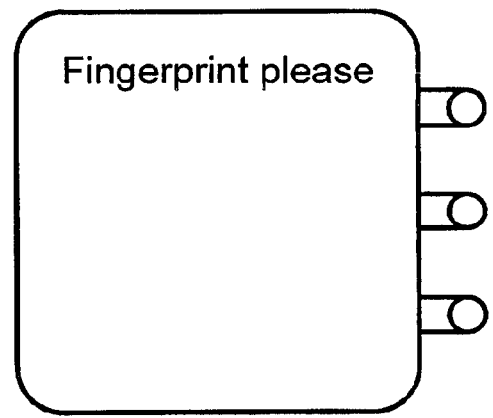
Finger 6a

HIGH SECURITY PERSONALIZED WIRELESS PORTABLE BIOMETRIC DEVICE

The present invention relates to communication between a portable hand operated biometric security device and more precisely to a wireless programmable hand held security device having a biometric system in the form of a fingerprint imager, and a plurality of items. The fingerprint images are used individually or in combination to authorize access to a selected item from the plurality of items.

BACKGROUND OF THE INVENTION

Is has always been an issue for everybody to protect his belongings. As such, many kinds of locks have been invented. Though, because each lock is supposedly unique, a key is only coupled to a unique lock. As such, if one equips a place with various locks, this person and everyone allowed to access this place needs as many keys as the number of locks equipping the place. Furthermore, for an easy and friendly use of the keys, most of the time, they must be identified as well as the corresponding locks in order not to try every key on every lock each time a user wants to open a door for example.

Moreover, the feeling of security is misplaced because a key is easy to copy or to steal. Indeed, in order to have their mail checked and/or their plants watered during their vacation, people are easily tempted to make copies of their home keys. Furthermore, to increase the difficulty of accessing a specific area, surveillance systems such as sophisticated alarm systems have been developed over the years. For these, a password must also be memorized. Unfortunately, criminals are ingenious enough to try to overcome any protective system.

Similarly, the inconvenience of trying to restrict access of an area is also true when, for safety, for good neighborhood relationship, and or for moral reasons, the use of items of the daily life must be restrained. It is difficult to forbid a child to use a potentially dangerous tool, for example. It is well known that the child probably will be tempted to try to use the forbidden item. Furthermore, some teenagers listen to music at a very high volume without any kind of consideration for other family members and neighbors. Thus, unless the forbidden item is locked in a piece of furniture, which means a further key or a lock with a numeric password to remember, or put it in an inaccessible location for a young child for example, which means to remember to put it back after each use, the temptation is often too great.

It is well known to those skills in the art that a security access system that provides substantially secure access and does not require a password or access code is a biometric identification system. A biometric identification system accepts unique biometric information from a user and identifies the user by matching the information against information belonging to registered users of the system. As a matter of fact, the ultimate method of personal identification is not a card, which can be lost, loaned or stolen, nor a number code, which can be discovered; but an unchangeable, non-transferable and indisputably unique characteristic of the person himself, in the form of biometric information such as a fingerprint. Fingerprint sensing and matching is a reliable technique for personal identification and/or verification.

In a fingerprint input transducer or sensor, the finger under investigation is usually pressed against a flat surface, such as a side of a glass plate; the ridge and valley pattern of the finger tip is sensed by a sensing means such as an interrogating light beam.

For example, U.S. Pat. No. 6,111,977 to Scott et al. discloses a hand-held portable fingerprint recognition and transmission device. The device includes a fingerprint scanner that encodes a fingerprint and sends via infrared or radio frequency transmitter the encoded fingerprint to a receiver located on the item to be secured. It is nonetheless necessary to have a central computer that analyzes the encoded fingerprint to allow recognition and authorization of an individual. The fingerprint scanner functions in conjunction with a keypad that allows specific operations. For example, in combination with a fingerprint, key 1 will open all the doors of the car, while key 2 opens only the trunk of the car. The keypad may also be used for providing a password for activating the fingerprint scanner.

A disadvantage of the device of Scott et al. is that in selecting a function using the keypad, memorisation of available functions and associated keys is required. Alternatively, every key is associated with one and only one function when the keypad is labeled.

In U.S. Pat. No. 6,088,585 to Schmitt et al. is disclosed a portable telecommunication device including a radio transceiver within a portable housing, a fingerprint sensor carried by the housing, and an authorizing feature for permitting use of the radio transceiver based upon the fingerprint sensor sensing a fingerprint of an authorized user.

A disadvantage of the device of Schmitt et al. is that the biometric sensor serves only a single security function—providing access to the telecommunications device—and is not useful for other functions, even though the overall device is a portable wireless transmitter.

Therefore, it is an abject of this invention to overcome such disadvantage and to provide a wireless personalized biometric device for receiving communication data from a plurality of devices in the vicinity of the wireless personalized device and for sending data to effect a function on a selected device from the plurality of devices.

It is a further object of the instant invention to provide a wireless personalized transceiver device to select a function from a plurality of available functions.

Still a further object of the instant invention is to provide a personalized and highly secure device to limit the use of a plurality of devices.

SUMMARY OF THE INVENTION

In accordance of an embodiment of the present invention, there is provided a personalized wireless portable biometric device comprising:

- a transceiver for transmitting a wireless data signal and for receiving a wireless data signal including received data;
- a display for displaying data in a human readable form;
- at least a processor for receiving the received data and for determining a plurality of available functions each associated with an operator, the processor for providing a signal to the display based on the determined plurality of available functions;
- a transducer for receiving selection data indicative of a function from the plurality of available functions selected by a user of the personalized wireless portable biometric security device and providing the selection data to the processor;
- wherein the processor is for receiving the selection data and for providing to the transceiver for transmission send data indicative of the function and the associated operator for actuating the function.

In accordance to a further embodiment of the present invention, there is provided a personalized wireless portable biometric system comprising:

a transceiver for transmitting a wireless data signal and for receiving a wireless data signal including received data;

a display for displaying data in a human readable form;

at least a processor for receiving the received data and for determining a plurality of available functions each associated with an operator, the processor for providing a signal to the display based on the determined plurality of available functions;

a transducer for receiving selection data indicative of a function from the plurality of available functions selected by a user of the personalized wireless portable biometric security device and providing the selection data to the processor;

wherein the processor is for receiving the selection data and for providing to the transceiver for transmission send data indicative of the function and the associated operator for actuating the function; and an operator associated with the available functions and for, in dependence upon received data, performing a function, the operator comprising a transceiver for receiving the send data transmitted by the personalized wireless portable biometric security device.

In accordance to a further embodiment of the present invention, there is provided a method for using a personalized wireless portable biometric device comprising the steps of:

transmitting a wireless data signal to a transceiver, receiving a wireless data signal including received data to the transceiver and for providing the received data;

displaying data in a human readable form on a display;

providing a processor for receiving the received data, for determining a plurality of available functions each associated with an operator, and for providing a signal to the display based on the determined plurality of available functions;

providing a transducer for receiving selection data indicative of a function from the plurality of available functions selected by a user of the personalized wireless portable biometric security device and providing the selection data to the processor;

wherein the step of providing the processor is for receiving the selection data and for providing to the transceiver for transmission therefrom data indicative of the function and the associated operator for actuating the function.

BRIEF DESCRIPTION OF THE DRAWINGS

FIGS. 5a–c illustrate display screens in a human readable language of the method of FIG. 5;

DETAILED DESCRIPTION OF THE INVENTION

Figure 1:
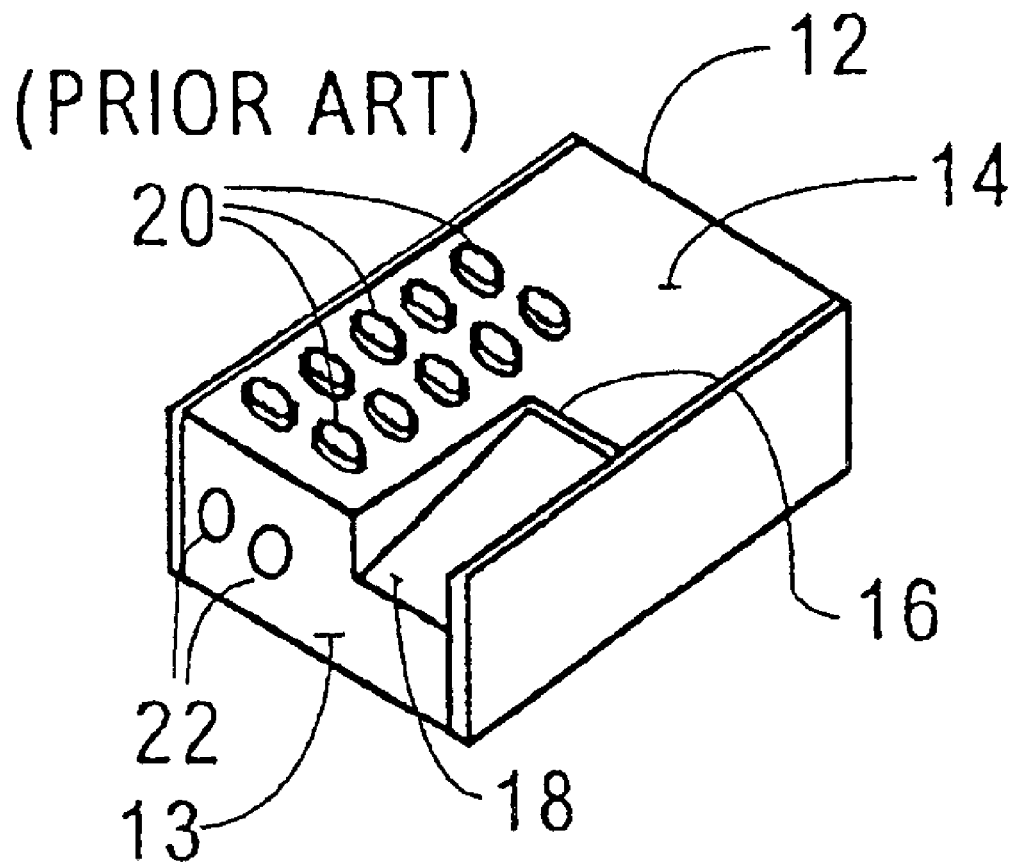
FIG. 1, is a prior art hand-held fingerprint security device.

Referring to FIG. 1, the hand-held fingerprint security device resides in a housing 12, which is about the size of a cigarette package or a deck of playing cards. The housing 12 includes a front wall 13 and an upper surface 14 with a fingerprint recognition area 16 having a transparent surface 18. Push switches 20 in the upper surface 14 provide a keypad. A wireless transceiver, for transmitting fingerprint information, is housed hidden beneath the upper surface 14 and includes transmit and receive ports at openings 22 in the front wall 13. The hand-held fingerprint security device overcomes the problem of destructive vandalism sometimes suffered by permanently mounted restrictive entry devices, however as previously mentioned, the hand-held security device is bulky. If it is made much smaller the push switches 20 become difficult to selectively operate, as a person's finger will span several push switches. Furthermore, although it is desirable to provide an inexpensive mass producible hand-held portable device, reliable push switches are relatively expensive. If the push switches 20 are eliminated, the user no longer has control over which functions are being activated.

Unfortunately, even if a device combines a biometric sensor and push switches, only a few functions are conveniently available. Inconveniently, different functions such as unlocking different doors of a car must be memorized as well as the push switch for accessing the function. Forgetting a function or push switch makes the device useless for that function.

According to the invention it is proposed to provide a wireless biometric sensor with a display for displaying functions available in the vicinity of the device and allowing communication from a user for providing choice data, for allowing a secure and personalized use of the functions.

Figure 2:
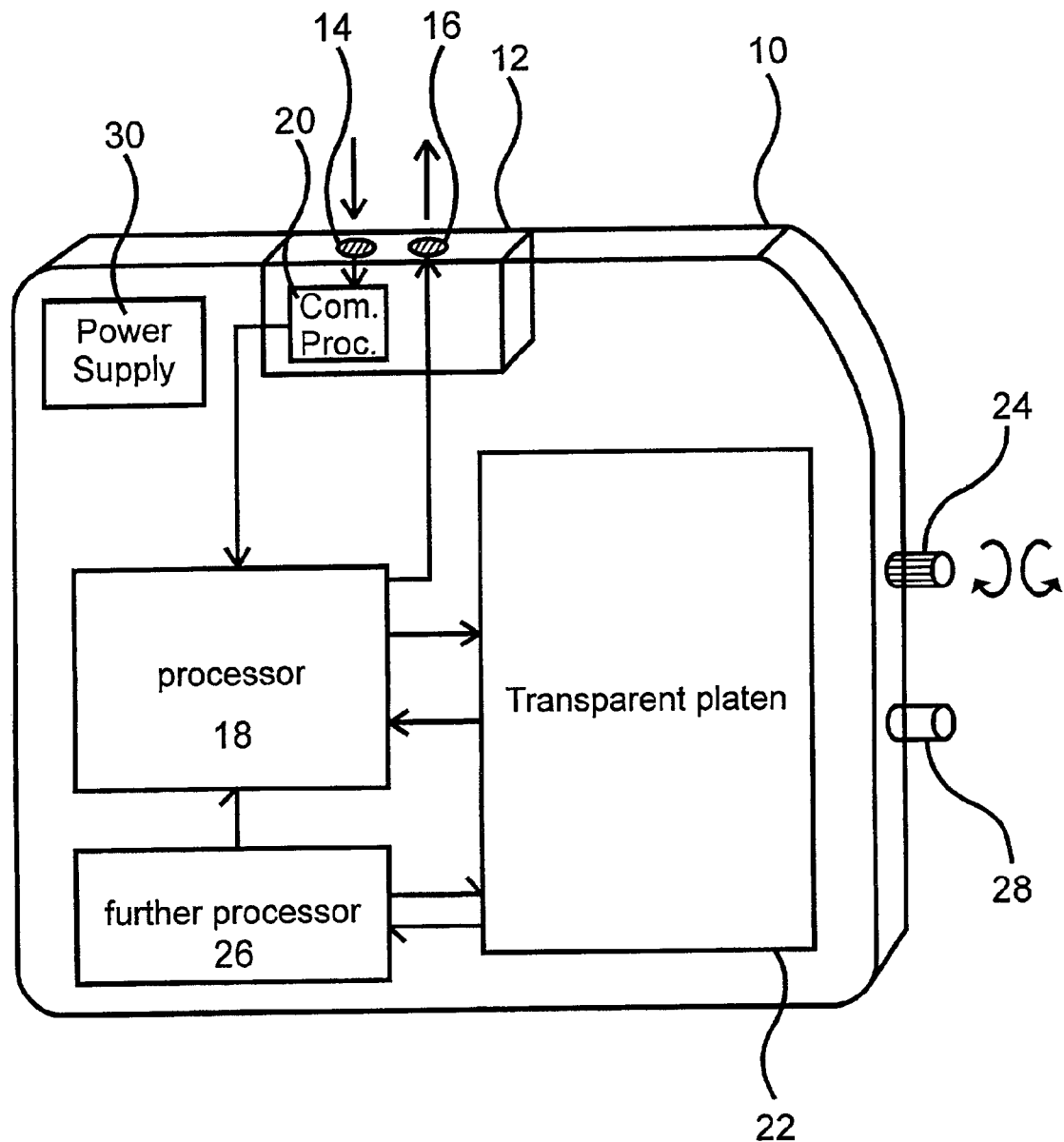
FIG. 2 is a perspective view of a preferred embodiment of the present invention.

Referring now to FIG. 2, a preferred embodiment of the present invention is shown. The personalized wireless portable biometric security device 10 is housed to an ubiquitous small pocket sized object, as for example a watch or a key holder. The device comprises a transceiver 12 for receiving wireless data signal via an input port 14 and for transmitting wireless data signal via an output port 16. The reception and transmission of wireless data signal through the input and output ports respectively are in the form of infrared (IR) signals or radio frequency (RF) signals, for example. Optionally, a single input/output port is provided. The wireless data signals are received from a plurality of devices in close proximity to the personalized wireless portable biometric device 10. The wireless data signal is transmitted for reception by a selected device from the plurality of devices. Of course it is recognized by those of skill in the art that several devices may receive the signal and, its function code is preferably unique to one function of one device. The wireless data signals received via the input port 14 are transmitted to a processor 18 via a communication processor 20. Optionally processors 18 and 20 are a same processor. The processor 18 analyses the wireless data signal and recognizes the plurality of devices having communicated with the personalized wireless portable biometric security device 10. The processor informs a user of the personalized wireless portable biometric security device 10, via a transparent platen 22 on the front face of the security device that provides a view of a display screen, which devices are accessible. By recognizing the plurality of devices in the vicinity, the processor 18 also recognizes all functions accessible devices support via wireless control. A scroll touch 24 or any other transducer for making a selection allows selection of a device from the plurality of operators. Upon the selection of a specific device, the processor 18 informs the user via the transparent platen 22, of the specific functions associated with the selected device. The scroll touch 24 allows selecting a function from the plurality of functions accessible for the selected device. Of course, the functions are optionally arranged hierarchically such that a function class is selected providing functions within that class and so forth. Further, when a number of functions or devices is prohibitive, the processor is optionally provided with executable code for providing the user with a hierarchical menu of devices and/or functions.

The transparent platen 22 also carries a biometric sensor in the form of a capacitive array for sensing biometric characteristics of any of a person's digit tips. The fingerprint imager allows imaging of a fingerprint, which is analyzed by a further processor 26. Alternatively, another form of biometric sensor is employed. The further processor processes the fingerprint, i.e. the fingerprint is digitized, and an image of the fingerprint is formed and then characterized. Upon recognition of the fingerprint, the further processor 26 communicates with the processor 18, which sends a transmission signal through the output port 16. In case of failure of recognition of the fingerprint image, the further processor 26 does not communicate with the processor 18. In such a case, no transmission signal is sent through the output port 16, and the user is prompted to provide biometric information a further time.

The device 10 possesses its own power supply 30 in the form, for example, of batteries. To avoid consuming too much energy by being constantly activated, activation of the fingerprint imager is achieved by way of, for example, an on/off push button 28, or any available activator such as a pressure sensitive platen or a thermo sensitive platen.

Figure 3:
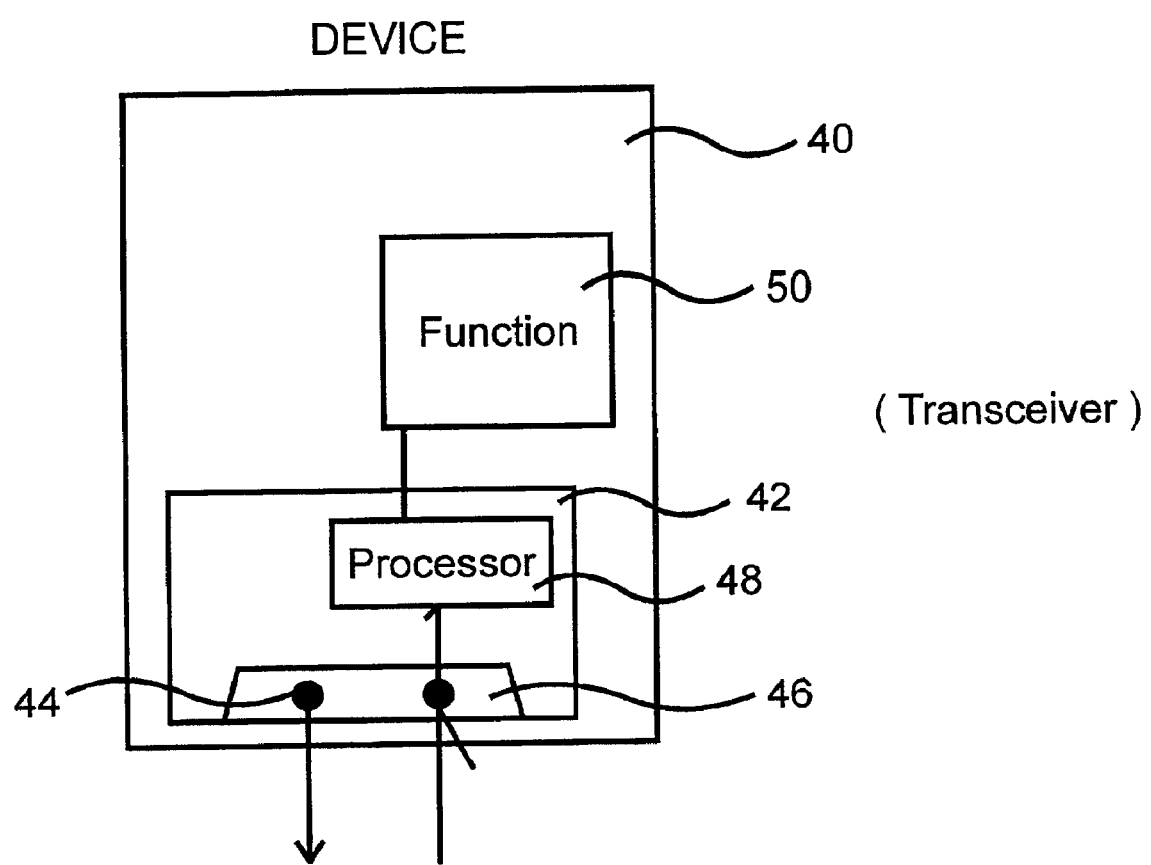
FIG. 3 shows a portion of a device in accordance with the invention.

Referring to FIG. 3, a device 40 is illustrated according to an aspect of the present invention. To be in communication with the personalized wireless portable biometric security device 10, the device 40 is equipped with a transceiver 42, which comprises an output port 44 for transmitting an identification signal to the personalized wireless portable biometric security device 10. The identification signal transmitted to the personalized wireless portable biometric security device 10 is indicative of the kind of device in the vicinity of the personalized wireless portable biometric security device. For example, when a user having such a device penetrates into his living room, a television, a VCR, and a sound system send data, for example in the form of a radio frequency signals with different encoding associated with a TV, a sound system or a VCR. Therefore, the personalized wireless portable biometric security device 10 recognizes the various devices within the vicinity and accesses a plurality of functions associated with each device. The transceiver also comprises an input port 46 for receiving data from the personalized wireless portable biometric security device 10. The received data are communicated to a programmable processor 48. Depending on the device and the functions supported by the device, an operator, i.e. a signal associated with the specific function for initiating the specific function is sent by the personalized wireless portable biometric device 10 to the transceiver 42. Thus, the processor 48 initiates a specific function of the device 40 from a plurality of functions 50 achievable by the device 40.

For example, commonly available electronic devices such as VCRs are controllable by way of remote control units using IR communication. According to the present embodiment, the VCR transmits each supported control code and an identifier for the control code. Typically, the identifier is a title such as "play", "rewind", etc. The codes are received by the portable wireless device. The user of the portable wireless device then selects an identifier and the associated code is transmitted to the VCR via an IR output port and the VCR initiates the associated function. As such, the portable wireless device need not know the codes associated with any device until it receives from the device codes and identifiers.

Figure 4:
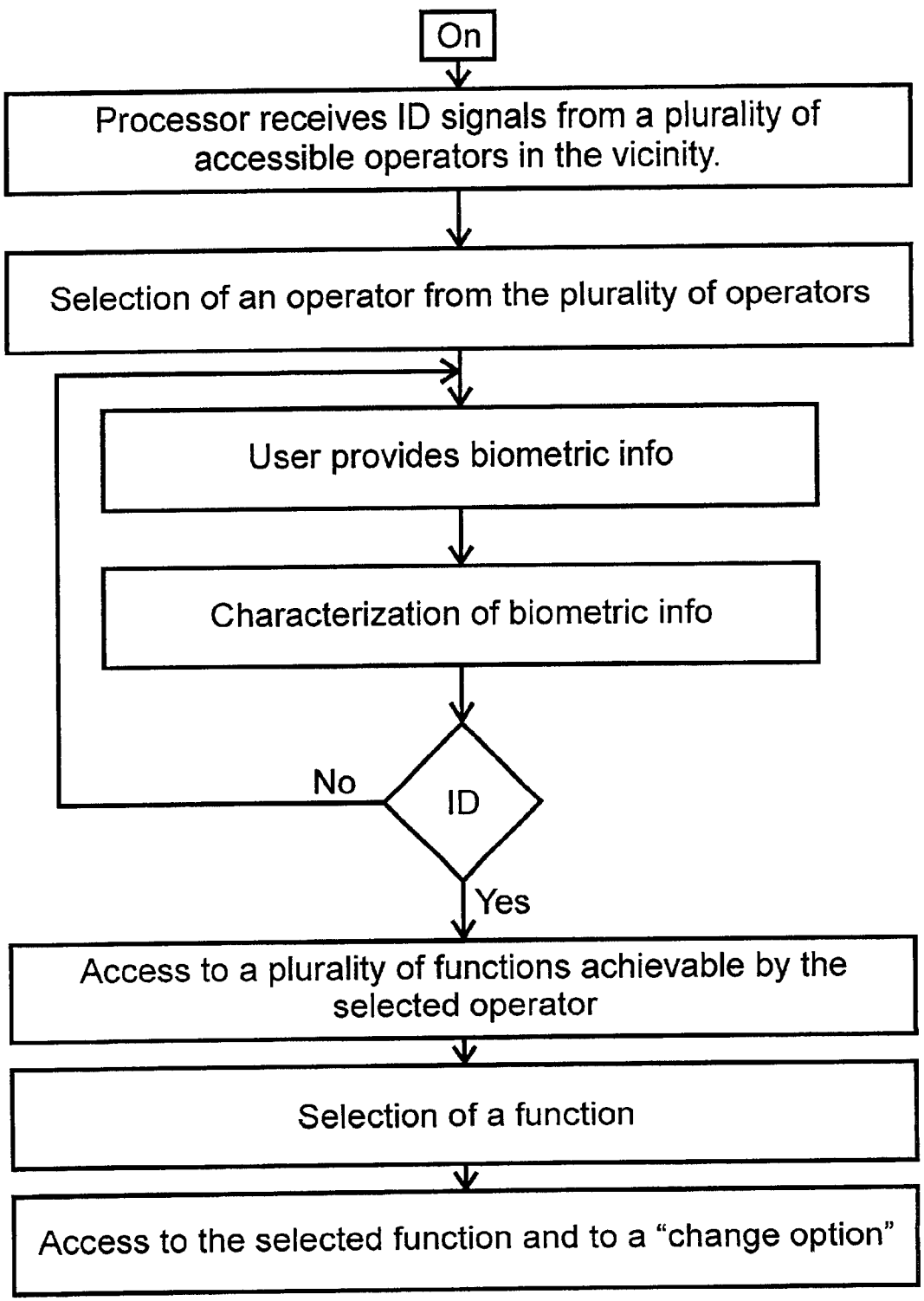
FIG. 4 is a flow diagram of a method of programming a device according to the invention.

Advantageously, the processor 48 transmits data to the devices; it is therefore possible to introduce certain limitations in the use of a specific operator. For example, the volume of the sound system can be set in such a way that between 10 P.M. and 8 A.M. the volume cannot exceed a reasonable limit. Similarly, a parent can restrict the access of a car to certain days or hours, combined eventually with a speed restriction. As shown in FIG. 4, such limitations to a device are easily achieved. When activated, the processor 18 of the device receives identification signals from a plurality of devices in the vicinity; a user selects a device from the plurality of devices. Via the transparent platen, the user is prompted to provide biometric information in the form of a fingerprint; the fingerprint is imaged, the further processor 26 characterizes and compares the image data against previously stored images of the fingerprint. Upon recognition of the fingerprint, the further processor 26 informs the processor 18 that accesses a plurality of functions achievable by the selected device. Furthermore, the processor 48 of the device being programmable, the processor 26 of the security device 10 accesses an option to modify the initial programming of the processor 48. Therefore, depending on the function selected, it is possible to reset some parameters of a specific function or a plurality of functions of a device.

Alternatively, specific functions are limited based on a user identification or a remote wireless device used. For example, one device may provide access to all functions while another has limited functionality. Alternatively, the devices provide functionality support limited based on user identification provided from the portable wireless devices.

Figure 5:
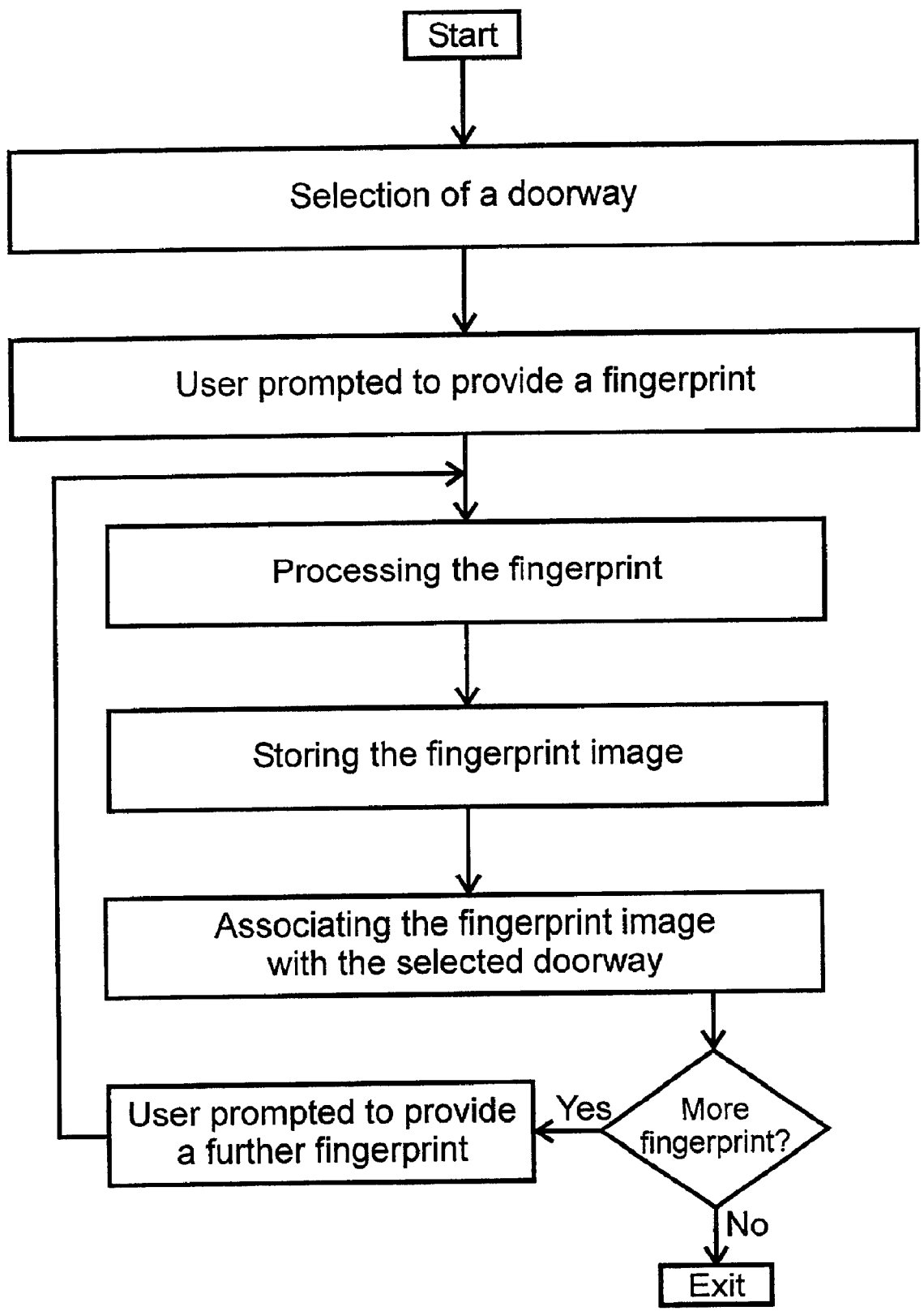
FIG. 5 is a flow diagram of a method according to the present invention for assigning a fingerprint or a combination of fingerprints.

FIG. 5 is a flow diagram of a method according to the present invention for assigning a fingerprint or a combination of fingerprints to an operator. FIGS. 5a–c illustrate display screens in a human readable language, i.e. in the form of words or of icons, of the different steps of assigning a fingerprint or a combination of fingerprints to a device associated with the flow diagram of FIG. 5. A first step is to select a device from a plurality of devices; the user is then prompted to select a fingertip and to press it on the platen 22 of the biometric device in order for the fingerprint of the fingertip to be imaged. The fingerprint is processed, i.e. the fingerprint is digitized, an image of the fingerprint is formed and then characterized. The determined fingerprint is associated with the selected device. To increase the level of security and or safety the user might choose to associate a further fingerprint to the device. In such a case, the user is prompted to provide a further fingertip and to press it on the platen 22 of the biometric device in order for the further fingerprint of the further fingertip to be imaged. The further fingerprint is processed, i.e. the further fingerprint is digitized, and an image of the further fingerprint is formed and then characterized. The further fingerprint is associated with the selected device. Therefore, a combination of fingerprints is assigned to the selected device. When the selected device is a secure device, the secure code for accessing the device is then secured in the wireless handheld device appropriately.

Accordingly, the use of programming allows for entering of short cuts to associate a fingerprint or combination of fingerprints with an access code or function code. Alternatively, it is used to allow a single function that is accessible on several separate devices to be distinguished with less menu driven input requirements. For example, a VCR and a television have channel related functions. Providing one set of channel controls and activating the VCR or the Television in dependence upon which biometric information source is provided to the biometric sensor allows for additional ease of use in some situations.

Figure 6:
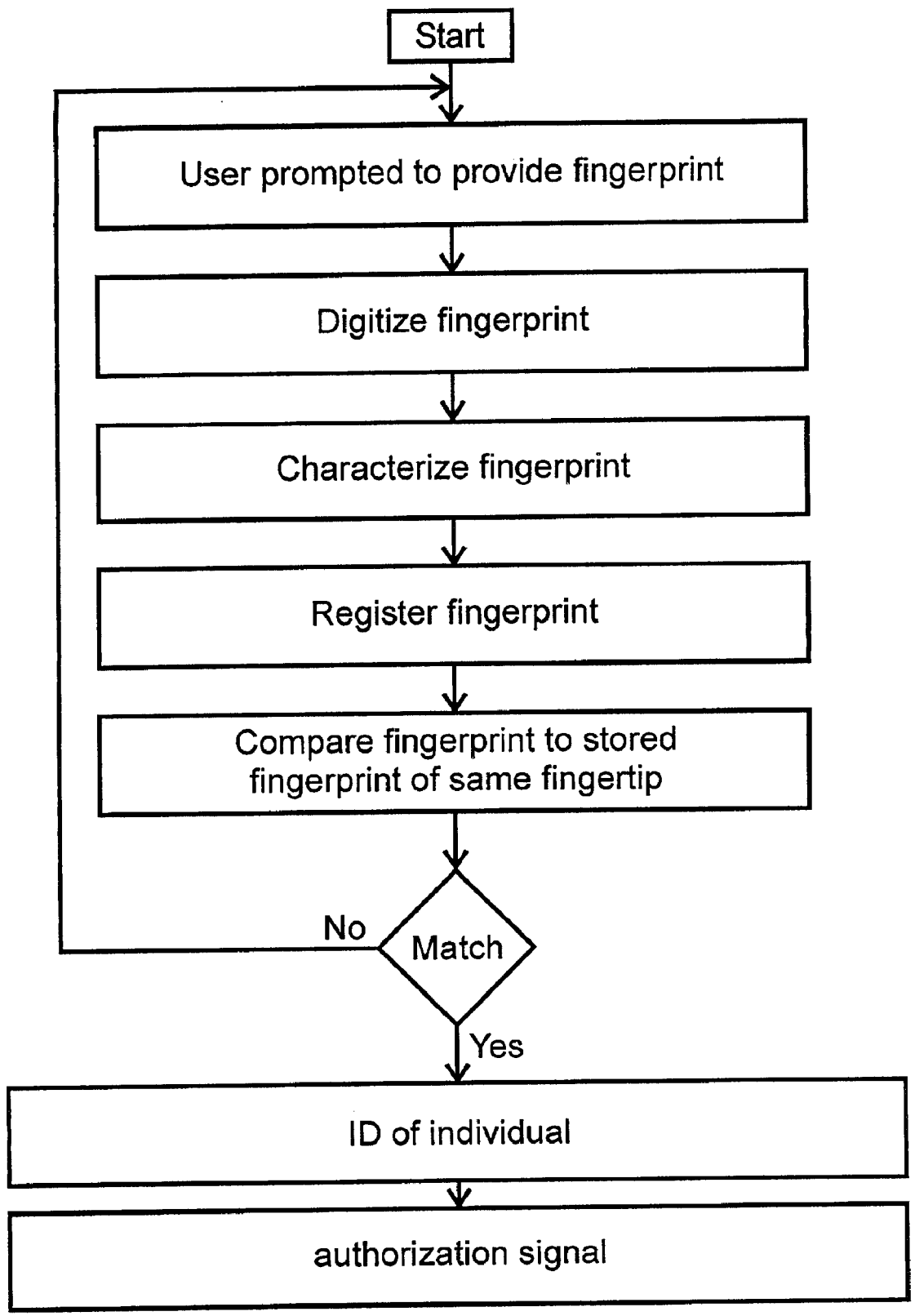
FIG. 6 is a flow diagram of a method according to the present invention for identifying a user upon recognition of a fingerprint; and, FIG. 6a illustrate a display screen in a human readable language of the method of FIG. 6.

FIG. 6 is a flow diagram of a method according to the present invention for identifying a user upon recognition of a fingerprint. FIG. 6a is an illustrative display screen of the first step of identifying a user upon recognition of a fingerprint associated with the flow diagram of FIG. 6. The user selects the fingertip associated with the operator and presses it onto the platen 22 of the wireless portable biometric device. The fingerprint of the selected fingertip is imaged, the biometric information is digitised to form an image of the fingerprint, and the fingerprint is characterized. The characterisation data is compared to templates corresponding to the selected fingertip assigned to the specific doorway stored previously while the user assigned a fingerprint to the selected device. Upon the results of the comparison between the characterisation data and templates relating to a same fingertip, if a match exists, the further processor 26 identifies the user and initiates transmission of an authorization signal toward the processor 18, which sends a transmission signal through the output port 16. If the further processor 26 is not able to find a match between the characterisation data and the stored templates, the user may provide the same fingerprint to the imager to reinitiate an authorization process.

Of course, for some devices where security is of no concern, the invention may be employed absent a fingerprint imager and absent user identification.

Numerous other embodiments may be envisaged without departing from the spirit and scope of the invention. For example, providing biometric information to the personalized wireless portable device is not a prerequisite for using the personalized wireless portable device. Indeed, if it is such needed, it is possible to secure access to specific functions of a device or to the device itself.

What is claimed is:

1. A personalized wireless portable control device comprising:
    a transceiver for transmitting a wireless data signal and for receiving a wireless data signal including received data and for providing the received data;
    a display for displaying data in a human readable form;
    a processor for receiving the received data, for determining a plurality of available functions each associated with an operator, and for providing a signal to the display based on the determined plurality of available functions;
    a transducer for receiving selection data indicative of a function from the plurality of available functions selected by a user of the personalized wireless portable biometric security device and providing the selection data to the processor;
    wherein the processor is for receiving the selection data and for providing to the transceiver for transmission therefrom data indicative of the function and the associated operator for actuating the function.

2. A personalized wireless portable control security device according to claim 1 comprising:
    a contact imager including a platen disposed for accepting a biometric information source thereon, the contact imager for capturing an image of the biometric information source and for providing a first signal including biometric data in dependence thereon;
    wherein the processor includes a processor for receiving the first signal, for processing the biometric data, for comparing data derived from the biometric data with a stored template, and for, in dependence upon a comparison result associating biometric data with an individual identity or authorisation, and
    wherein the send data includes data relating to the individual identity or authorisation.

3. A personalized wireless portable control device according to claim 2, wherein the contact imager is a fingerprint imager.

4. A personalized wireless portable control device according to claim 3, wherein the contact imager and the transducer are a same device and wherein the display is for displaying information for viewing on or through the contact imager platen.

5. A personalized wireless portable control device according to claim 1 comprising:
    a contact imager including a platen disposed for accepting a biometric information source thereon, the contact imager for capturing an image of the biometric information source and for providing a first signal including biometric data in dependence thereon; and
    wherein the send data includes the biometric data.

6. A personalized wireless portable control device according to claim 5, wherein the contact imager is a fingerprint imager.

7. A personalized wireless portable control device according to claim 6, wherein the contact imager and the transducer are a same device and wherein the display is for displaying information for viewing on or through the contact imager platen.

8. A personalized wireless portable control device according to claim 1, wherein the function is one of locking or unlocking and wherein the operator is a signal for actuating one of locking or unlocking a device.

9. A personalized wireless portable control device according to claim 1, wherein the function is reading data and wherein the operator is a signal for initiating data reading by a device.

10. A personalized wireless portable control device according to claim 1, wherein the function is one of enabling or disabling and wherein the operator is a signal for actuating one of enabling or disabling a device.

11. A high security personalized wireless portable control device as defined in claim 1 comprising a selecting means for selecting data indicative of the function and the associated operator for actuating the function.

12. A high security personalized wireless portable control device as defined in claim 1 comprising a further means for confirming the selection of a data indicative of the function and the associated operator for actuating the function.

13. A high security personalized wireless portable control device as defined in claim 1 comprising a second further means for actuating the device.

14. A high security personalized wireless portable control device as defined in claim 13 comprising a power source.

15. A high security personalized wireless portable control device as defined in claim 1 housed in an ubiquitous pocket sized object.

16. A personalized wireless portable control system according to claim 15 comprising:

a contact imager including a platen disposed for accepting a biometric information source thereon, the contact imager for capturing an image of the biometric information source and for providing a first signal including biometric data in dependence thereon;

wherein the at least a processor includes a processor for receiving the first signal, for processing the biometric data, for comparing data derived from the biometric data with a stored template, and for, in dependence upon a comparison result associating biometric data with an individual identity or authorisation, and wherein the send data includes data relating to the individual identity or authorisation.

17. A high security personalized wireless portable control device as defined in claim 1 comprising an on/off means for allowing at least one of activating and deactivating the portable biometric device.

18. A personalized wireless portable control system according to claim 17, wherein the contact imager is a fingerprint imager.

19. A personalized wireless portable control system comprising:

a transceiver for transmitting a wireless data signal and for receiving a wireless data signal including received data;

a display for displaying data in a human readable form;

at least a processor for receiving the received data and for determining a plurality of available functions each associated with an operator, the processor for providing a signal to the display based on the determined plurality of available functions;

a transducer for receiving selection data indicative of a function from the plurality of available functions selected by a user of the personalized wireless portable biometric security device and providing the selection data to the processor;

wherein the processor is for receiving the selection data and for providing to the transceiver for transmission send data indicative of the function and the associated operator for actuating the function; and an operator for performing at least a function and including a transceiver for receiving data transmitted by the personalized wireless portable biometric security device.

20. A method for using a personalized wireless portable control system comprising the steps of:

transmitting a wireless data signal to a transceiver, receiving a wireless data signal including received data to the transceiver and for providing the received data;

displaying data in a human readable form on a display;

providing a processor for receiving the received data, for determining a plurality of available functions each associated with an operator, and for providing a signal to the display based on the determined plurality of available functions;

providing a transducer for receiving selection data indicative of a function from the plurality of available functions selected by a user of the personalized wireless portable biometric security device and providing the selection data to the processor;

wherein the step of providing the processor is for receiving the selection data and for providing to the transceiver for transmission therefrom data indicative of the function and the associated operator for actuating the function.

21. A method for using a personalized wireless portable control system according to claim 20 comprising the step of:

providing biometric information to a contact imager wherein the contact imager includes a platen disposed for accepting a biometric information source thereon, the contact imager for capturing an image of the biometric information source and for providing a first signal including biometric data in dependence thereon;

wherein the processor includes a processor for receiving the first signal, for processing the biometric data, for comparing data derived from the biometric data with a stored template, and for, in dependence upon a comparison result associating biometric data with an individual identity or authorisation, and wherein the send data includes data relating to the individual identity or authorisation.

22. A method for using a personalized wireless portable control system according to claim 21 wherein the step of providing biometric information comprises the step of providing fingerprint to the contact imager wherein the contact imager is a fingerprint imager.

23. A method for using a personalized wireless portable biometric device according to claim 21 wherein the step of determining a plurality of available functions each associated with an operator comprises the function of locking or unlocking wherein the operator is a signal for actuating one of locking or unlocking a device.

24. A method for using a personalized wireless portable control system according to claim 21 wherein the step of determining a plurality of available functions each associated with an operator comprises the function of reading data wherein the operator is a signal for initiating data reading by a device.

25. A method for using a personalized wireless portable control system according to claim 21 wherein the step of determining a plurality of available functions each associated with an operator comprises the function of enabling or disabling wherein the operator is a signal for actuating one of enabling or disabling a device.

* * * * *